Patented Jan. 21, 1930

1,744,596

UNITED STATES PATENT OFFICE

CHRISTIAAN van LOON, OF DORDRECHT, NETHERLANDS, ASSIGNOR TO NAAMLOOZE VENNOOTSCHAP ANTON JURGENS MARGARINEFABRIEKEN, OF NIJMEGEN, NETHERLANDS

PROCESS FOR THE CONVERSION OF TRIGLYCERIDES WITH OTHER ESTERS

No Drawing.  Application filed February 24, 1927.  Serial No. 170,749.

The invention relates to an improved process for the conversion of triglycerides with other esters in such a way that an interchange of the fatty acid radicals is effected.

Schematically the reaction may be formulated in this way:

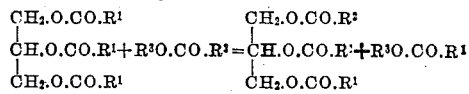

In this equation $.CO.R^1$ and $.CO.R^2$ represent acid radicals, and in which $R^3$ represents the hydrocarbon radical of an alcohol for example, $R^3OH$. It will be understood that the formula is schematical, it only shows an interchange of two acid radicals but in reality the interchange of acid radicals continues and tends to attain an equilibrium arrangement of acid radicals.

About this conversion between neutral esters very little is known especially as regards suitable catalysts.

In the absence of catalysts the conversion between triglycerides and other esters proceeds at such an extremely slow rate, even at temperatures of 250–300° C., that it does not come to an end in many hours or even days.

According to my invention the conversion between triglycerides and other esters may be effected in a much shorter time or at a much lower temperature or both, by adding the same or such-like substances, as have a catalytic effect in the esterification of free fatty acids and free alcohol-groups or in the action of a free fatty acid or a free alcohol on a triglyceride namely such substances e. g. as: aromatic or aliphatic-aromatic sulphonic acids; metals like cadmium, lead, tin and zinc and their compounds; compounds of the alkali metals or of the alkaline earth metals, etc. or mixtures of these catalysts. With some of these catalysts it is profitable to use them in a finely divided state, or in any other known way, e. g. precipitated on a carrier, and to stir during the reaction.

It further appeared according to the invention that the reaction may be advantageously performed under reduced pressure and/or in an atmosphere of inert gases though it should be understood that under higher pressures than atmospheric pressure good results may also be obtained.

The invention renders it possible to effect in an economic technical way an interchange of the fatty acid radicals between oils or fats and other esters, under such conditions and in such a short time, that the properties of these substances (colour, taste, odour, etc.) are not impaired. By this interchange new acidic and alcoholic radicals may be introduced into oils or fats. After the admixture of the esters to the triglycerides the melting point, solidifying point, etc. of the mixtures will be changed by the conversion, whereas those characteristics which represent a mean value for all radicals present (saponification value, iodine value, etc.) remain substantially unaltered. This process for the interchange of alcohol or acid radicals represents a great improvement from a technical point of view, as it is not longer necessary to first hydrolyze or to alcoholyze the fats and to subsequently esterify them, and because it is not necessary to work in apparatus, which are acid-proof.

In the case of volatile components one of course may use differences in volatility to push the conversion further than the equilibrium would permit.

The process may be applied to triglycerides in a neutral or nearly neutral condition, that is, triglycerides containing either no free fatty acids or a percentage of free fatty acids. Crude fats and oils containing a percentage of free fatty acids may be subjected to the conversion (if a catalyst is used which is not destroyed by the free fatty acids before it reacts) but in several cases it is advantageous to have said conversion preceded or followed by, or combined with known processes for treating fats or oils, such as for instance hardening or refining. The conversion may be continued till the state of equilibrium is reached or stopped earlier, according to the requirements the product has to meet.

*Example.*—Equal parts of neutral cocoanut oil and of ethylstearate with the addition of 2 percent of tin powder, were stirred at a temperature of 250° C. A slow current of carbon dioxide was passed over the mixture so as to protect it from the air. The agreeable odour of the lower ethylesters was immediately observed. After heating for 1½ hours the current of carbon dioxide was accelerated so as to distil the more volatile ethylesters of the cocoanut oil fatty acids, which had been formed by the reaction. The distillate was practically neutral and showed the saponification number 245 whereas the calculated value for ethylstearate is 180 and for ethyllaurate 246. Conversion of the ethylestearate to ethylesters of the cocoanut oil fatty acids is evident.

If no catalysts were added, no lower ethylesters could be isolated, even after a much longer heating period.

I claim:

1. A process for the conversion of triglycerides in a neutral or nearly neutral condition with non-glyceride esters, by heating them for such a time that an interchange of the acid radicals takes place, consisting in the use of substances as catalysts which catalytically promote the esterification of free fatty acids and free alcohols.

2. A process for the conversion of triglycerides in a neutral or nearly neutral condition with non-glyceride esters, by heating them for such a time that an interchange of the acid radicals takes place, consisting in the use of substances as catalysts which catalytically promote the action of free alcohols on triglycerides.

3. A process for the conversion of triglycerides in a neutral or nearly neutral condition with non-glyceride esters, by heating them for such a time that an interchange of the acid radicals takes place, consisting in the use of substances as catalysts which catalytically promote the action of free fatty acids on triglycerides.

4. A process for the conversion of triglycerides in a neutral or nearly neutral condition with non-glyceride esters, by heating them for such a time that an interchange of the acid radicals takes place, consisting in the use of substances as catalysts which catalytically promote the esterification of free fatty acids and free alcohols and performing said conversion under reduced pressure.

5. A process for the conversion of triglycerides in a neutral or nearly neutral condition with non-glyceride esters, by heating them for such a time that an interchange of the acid radicals takes place, consisting in the use of substances as catalysts which catalytically promote the action of free alcohols on triglycerides and performing said conversion under a pressure other than atmospheric pressure.

6. A process for the conversion of triglycerides in a neutral or nearly neutral condition with non-glyceride esters, by heating them for such a time that an interchange of the acid radicals takes place, consisting in the use of substances as catalysts which catalytically promote the action of free fatty acids on triglycerides and performing said conversion under reduced pressure.

7. A process for the conversion of triglycerides in a neutral or nearly neutral condition with non-glyceride esters, by heating them for such a time that an interchange of the acid radicals takes place, consisting in the use of substances as catalysts which catalytically promote the esterification of free fatty acids and free alcohols and performing said conversion in an atmosphere of inert gases.

8. A process for the conversion of triglycerides in a neutral or nearly neutral condition with non-glyceride esters, by heating them for such a time that an interchange of the acid radicals takes place, consisting in the use of substances as catalysts which catalytically promote the action of free alcohols on triglycerides and performing said conversion in an atmosphere of inert gases.

9. A process for the conversion of triglycerides in a neutral or nearly neutral condition with non-glyceride esters, by heating them for such a time that an interchange of the acid radicals takes place, consisting in the use of substances as catalysts which catalytically promote the action of free fatty acids on triglycerides and performing said conversion in an atmosphere of inert gases.

10. A process for the conversion of triglycerides in a neutral or nearly neutral condition with non-glyceride esters, by heating them for such a time that an interchange of the acid radicals takes place, consisting in the use of substances as catalysts which catalytically promote the esterification of free fatty acids and free alcohols and performing said conversion simultaneously under reduced pressure and in an atmosphere of inert gases.

11. A process for the conversion of triglycerides in a neutral or nearly neutral condition with non-glyceride esters, by heating them for such a time that an interchange of the acid radicals takes place, consisting in the use of substances as catalysts which catalytically promote the action of free alcohols on triglycerides and performing said conversion simultaneously under reduced pressure and in an atmosphere of inert gases.

12. A process for the conversion of triglycerides in a neutral or nearly neutral condition with non-glyceride esters, by heating them for such a time that an interchange of the acid radicals takes place, consisting in the use of substances as catalysts which catalytically promote the action of free fatty acids on triglycerides and performing said conversion simultaneously under reduced pressure and in an atmosphere of inert gases.

In testimony whereof I affix my signature.

CHRISTIAAN van LOON.